(12) United States Patent
Jorgensen

(10) Patent No.: US 8,753,732 B2
(45) Date of Patent: Jun. 17, 2014

(54) FLEXIBLE INSULATING PRODUCT

(75) Inventor: Kristian Skovgaard Jorgensen, Roskilde (DK)

(73) Assignee: Rockwool International A/S, Hedehusene (DK)

(*) Notice: Subject to any disclaimer, the term of this patent is extended or adjusted under 35 U.S.C. 154(b) by 512 days.

(21) Appl. No.: 13/126,707

(22) PCT Filed: Oct. 30, 2009

(86) PCT No.: PCT/EP2009/007777
§ 371 (c)(1), (2), (4) Date: Aug. 3, 2011

(87) PCT Pub. No.: WO2010/049164
PCT Pub. Date: May 6, 2010

(65) Prior Publication Data
US 2011/0281060 A1 Nov. 17, 2011

(30) Foreign Application Priority Data
Oct. 31, 2008 (EP) .................................. 08253580

(51) Int. Cl.
*F16L 59/02* (2006.01)
*B32B 7/08* (2006.01)

(52) U.S. Cl.
USPC .................. 428/102; 428/54; 428/68; 428/98

(58) Field of Classification Search
USPC ........................................ 428/102, 54, 68, 98
See application file for complete search history.

(56) References Cited

U.S. PATENT DOCUMENTS

| 2,460,848 A | 2/1949 | Rover |
| 4,877,689 A | 10/1989 | Onstott |
| 5,654,060 A * | 8/1997 | Holman et al. ................. 428/68 |
| 2003/0145773 A1 | 8/2003 | Barney et al. |

FOREIGN PATENT DOCUMENTS

| EP | 1589200 | 10/2005 |
| JP | 61-160925 | 10/1986 |
| WO | WO-83/03796 A1 | 11/1983 |
| WO | WO-93/21061 A1 | 10/1993 |
| WO | WO-2005/003476 A2 | 1/2005 |

* cited by examiner

*Primary Examiner* — Brent O'Hern
(74) *Attorney, Agent, or Firm* — Tarolli, Sundheim, Covell & Tummino LLP

(57) ABSTRACT

A flexible heat insulation product (1) comprising a flexible heat insulating core layer (4) with a first side (3) and a second side (9), and a flexible facing (2) that is connected to the first side (3) of the insulating core layer (4) by a plurality of elements (7) that extends from the facing (2) to the second side (9) of the insulating core layer (4). The insulation product (1) further comprises a flexible heat insulating cover layer (8) that is secured to the second side (9) of the insulating core layer (4). A method for producing such a product is also disclosed.

10 Claims, 1 Drawing Sheet

FLEXIBLE INSULATING PRODUCT

FIELD OF THE INVENTION

The invention relates to an insulating product according to the introduction of claim 1. The invention also relates to a method of producing such a product according to claim 11.

BACKGROUND OF THE INVENTION

One product of the type related to the invention is a so-called wired mat, which typically is used for thermal insulating of e.g. boilers, ventilation ducts, big diameter pipes and other technical installations.

Due to the flexibility of the wired mat, it can easily adapt to the surface of the product to be insulated even if the surface is non-planar, such as curved, angled etc.

Generally, a wired mat comprises a flexible mat or web of insulating material—typically mineral wool, such as glass wool or stone wool—with a flexible facing made of a metal wire mesh attached to one side of the mat. The mesh is conventionally stitched onto the mat by means of a number of metal threads that extends through some of the openings in the mesh and into and through the mat of insulating material. WO 93/21061 shows an example of such a wired mat. Numerous other examples of wired mats can be found in patent literature and on the market from various producers of mineral wool heat insulation products. In use, the side of the wired mat that is not provided with the metal mesh is arranged against the surface of the installation that is to be thermally insulated.

SUMMARY OF THE INVENTION

Although wired mats have been used in industry for heat insulation of technical installations for decades, the ever increasing demand for better heat insulation has prompted the inventors to make improvements to these kinds of products. One of the problems with the prior art insulating products is that the elements that extend from one side of the product to the other side, e.g. metal threads in case of conventional wired mats, form heat bridges that lead heat from the insulated installation to the outer side of the insulation. It is therefore an object of the present invention to provide an insulating product of the type mentioned in the opening paragraph which has better heat insulating properties than the hitherto known products.

This object is achieved by arranging the insulating product as provided in the characterising part of claim 1 and by using the method of claim 11.

By securing a flexible insulating cover layer to the core layer opposite the facing, it is ensured—when the insulating product is installed—that the elements extending through the facing and the core layer but not through the insulating cover layer do not contact the hot surface of the insulated installation, whereby the heat loss through these heat bridges is substantially reduced.

The flexible insulating core layer preferably has a thermal conductivity ($\lambda$-value) at 50° C. of less than 60, more preferably less than 50 and most preferably less than 40 mW/m·K. Typically, its thermal conductivity will be no less than 25 or 30 mW/m·K.

In a preferred embodiment, the flexible insulating core layer comprises mineral wool. Mineral wool, such as glass wool, stone wool or slag wool, has for a long time proved its value as a heat insulating material. Generally, mineral wool is made by fiberising a mineral melt, either by internal centrifuging (typical for glass wool) or by external centrifuging (typical for stone and slag wool). A binder is normally applied to ensure coherence of the fibres in the mineral wool such that a coherent product is obtained. The binder may be organic or inorganic depending on the final use of the product. Other substances may also be applied, e.g. oil for reducing dusting and/or for making the product water repellent. If the final product is to be classified as a fire resistant product or if it is to be used as insulation of hot surfaces, the amount of organic material (binder, oil, etc.) in the product must be low. As a consequence, such products have a decreased coherence and other means, such as needling or stitching, are often applied to ensure coherence and easy handling of the product. In particular, it is known to stitch a metal wire mesh and/or an aluminium foil and/or a paper sheet onto the surface of the mineral wool product by means of a metal thread that extends through the layer of mineral wool.

During production of the mineral wool product, the mineral wool may have been subjected to length and/or height compression and/or pleating and/or any other treatment for reorganizing the mineral fibres, so that the final product achieves specific properties with regards to density, rigidity, compression and tension strength, etc. The mineral wool core layer preferably has a density above 20 kg/m$^3$ or even above 40 kg/m$^3$, such as above 60 kg/m$^3$ or even above 80 kg/m$^3$. The density will normally be below 180 kg/m$^3$ or even below 160 kg/m$^3$, such as below 120 kg/m$^3$, or even below 100 kg/m$^3$.

The flexible insulating cover layer preferably has a thermal conductivity ($\lambda$-value) at 50° C. of less than 50, more preferably less than 40 and most preferably less than 30 mW/m·K. Usually, the cover layer will have a thermal conductivity ($\lambda$-value) of no less than 10, more usually no less than 15 and most often no less than 20 mW/m·K.

The flexible insulating cover layer may be made of any conventional insulating material, such as mineral wool, but in a preferred embodiment the insulating cover layer comprises aerogel.

When the term aerogel is used in this specification, it is meant to cover different kinds of dried gel products, commonly known as aerogels, xerogels and cryogels. These products are known to have excellent insulating properties, owing to their very high surface areas, high porosity and relatively large pore volume. They are manufactured by gelling a flowable sol-gel solution and then removing the liquid from the gel in a manner that does not destroy the pores of the gel.

Depending on the drying conditions, aerogels, xerogels or cryogels can be made. Where the wet gel is dried at above the critical point of the liquid, there is no capillary pressure and therefore relatively little shrinkage as the liquid is removed. The product of such a process is very highly porous and is known as an aerogel. On the other hand, if the gel is dried by evaporation under subcritical conditions, the resulting product is a xerogel. Although shrinkage is unhindered in the production of a xerogel, the material usually retains a very high porosity and a large surface area in combination with a very small pore size. When the gel is dried in a freeze-drying process, a cryogel is obtained.

Usually, the aerogel is based on a silica-containing sol-gel solution, but suitable aerogels may also be based on alumina or other metal oxides suitable for the sol-gel technique. If there is no fire resistance issue or high temperatures involved, the aerogel may also be made from organic precursors, such as resorcinol-formaldehyde, melamine-formaldehyde, polyimides, polyurethanes, polyisocyanurates and various unsaturated hydrocarbon materials.

The aerogel may be used in its pure form, but since pure aerogel products (including xerogel and cryogel products) are fragile and susceptible to cracking they are difficult to handle and might make the flexible insulation product of the invention too rigid. Therefore, in one embodiment, the aerogel is included as particles in a fibre matrix comprising organic and/or inorganic fibres. By the term "aerogel particles" is meant particles that are either monolithic or particles comprising smaller monolithic particles that are joined by a suitable binder and/or compressed to form a larger aerogel particle. The average diameter of the aerogel particle will normally be below 1 cm and above 2 mm, preferably above 5 mm. The average diameter is calculated as a weight average.

In another embodiment, the flexible insulating cover layer comprises organic and/or inorganic fibres included in an aerogel matrix, where the fibres serve to reinforce the material. These materials are known as aerogel matrix composites and are commonly produced in the form of flexible mats, which are typically manufactured by impregnating the reinforcing fibres with a flowable sol-gel solution, gelling and then removing the liquid from the gel in a manner that does not destroy the pores of the gel. Aerogel matrix composites are flexible, mechanically strong, good insulators and require a shorter processing time than pure aerogel. Aerogel matrix composites are also known in forms that are applicable for insulating surfaces at high temperatures, so often the insulating product with a cover layer comprising aerogel has improved properties in relation to thermal insulation of high temperature installations.

In a preferred embodiment, the fibres used in connection with the aerogel are mineral fibres, preferably stone fibres, which provide good fire properties to the product. Preferably, the insulating cover layer comprises at least 20 wt. % aerogel, more preferably at least 50 wt. %, even more preferably at least 80 wt. %, such as up to 90 wt. % or even up to 98 wt. %.

Generally, an insulating cover layer comprising aerogel can withstand higher temperatures than, e.g., mineral wool. Therefore, using aerogel in the insulating cover layer provides an insulating product that can be used in connection with installations that operate at higher temperatures than is the case with, e.g., mineral wool products.

The insulating cover layer is preferably secured to the core layer by an adhesive. Hereby, the use of any mechanical means that could act as heat bridges into the insulating product is avoided.

In a preferred embodiment, the adhesive is an inorganic adhesive. Generally, inorganic adhesives can withstand high temperatures and are without organic compounds so they do not influence negatively on the fire properties of the final product. The inorganic adhesive may be based on water, glass, or any other suitable inorganic substance.

In one embodiment, the flexible insulating core layer comprises a first core layer comprising mineral wool and a second core layer comprising aerogel, and the insulating cover layer is secured to the second core layer comprising aerogel. By having two, preferably identical, layers comprising aerogel facing each other, it is easy to find an adhesive that bonds well between the two layers.

The plurality of elements connecting the facing with the flexible insulating core layer preferably comprises one or more metal threads extending through the facing and the insulating core layer. It is already known that good product quality with regard to coherence and ease of handling can be obtained by sewing a mineral wool mat with a metal thread.

The facing is preferably a metal wire mesh, but it could also be a foil or sheet, such as an aluminium foil or a paper sheet. In the latter cases, the foil or sheet may be reinforced with glass fibres. Thus, the term "facing" when used in this specification is meant to mean any closed, perforated, or open sheet material that can be attached to the surface of the insulating core layer, including those mentioned above and any other facing material that can be handled like a sheet. The facing is flexible in the sense that it can be bent, so that the finished product is still adaptable to non-planar surfaces. This definition of the term "flexible" is also valid when used in relation to the insulating core layer or the insulating cover layer.

The method of producing an insulating product according to the invention comprises the following steps:

providing a flexible insulating core layer with a first side and a second side providing a facing, connecting the facing to the first side of the insulating core layer by a plurality of elements that extends from the facing to the second side of the insulating core layer, providing a flexible insulating cover layer, securing the insulating cover layer to the second side of the insulating core layer.

The result of this method is a product where the elements that secure the facing to the surface of the product and that improve the coherence of the product do not extend all through the thickness of the product and hence does not form heat bridges through the product.

The elements that connect the facing to the insulating core layer comprise preferably one or more threads that are stitched through the facing and the insulating core layer.

In the preferred embodiment, the insulating cover layer is secured to the insulating core layer by applying an adhesive to an interface between the insulating cover layer and the insulating core layer. In this manner, the insulating cover layer makes up a uniform insulating layer that—in use—shows no heat bridges between the insulated installation and the insulating core layer of the product.

BRIEF DESCRIPTION OF THE DRAWINGS

The invention will be described in the following by way of example with reference to the drawings in which.

DESCRIPTION OF PREFERRED EMBODIMENTS

Figure 1:
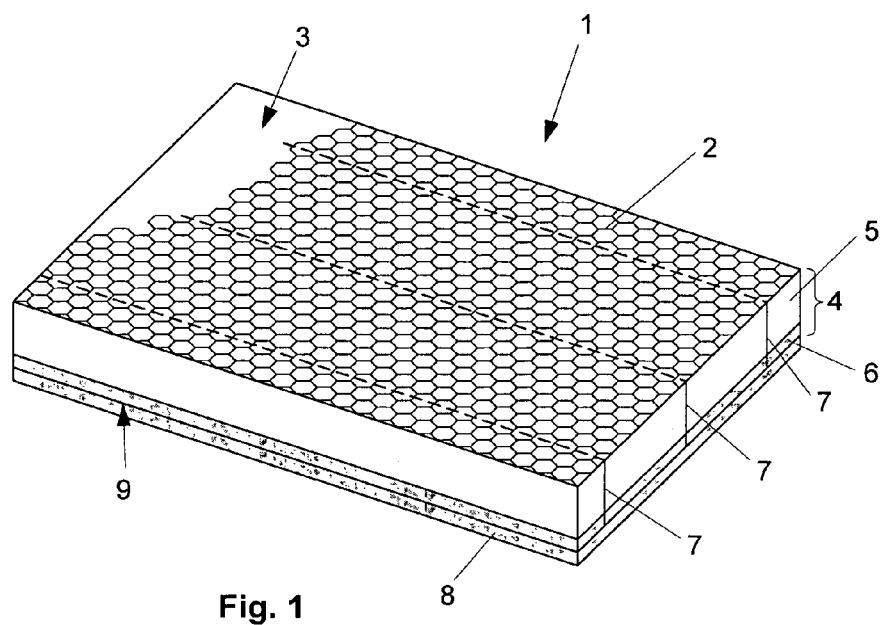
FIG. 1 shows a first embodiment of an insulating product according to the invention in perspective view.

FIG. 1 shows a first embodiment of a flexible insulating product 1 according to the invention. The product 1 is a so-called wired mat, since it is provided with a flexible metal wire mesh 2 on the first side 3 of a flexible insulating core layer 4. In this first embodiment, the insulating core layer 4 comprises two layers, namely a first core layer 5 comprising mineral wool and a second core layer 6 comprising a flexible aerogel matrix composite, preferably comprising aerogel reinforced with mineral fibres. The first and second core layers 5, 6 are interconnected to the wire mesh 2 by means of a plurality of metal threads 7 that are stitched through the wire mesh 2 and the first and second core layer 5, 6. A flexible insulating cover layer 8 is secured to the second side 9 of the insulating core layer 4, i.e. on the bottom side of the second core layer 6, by means of an inorganic adhesive that adheres well to the second core layer 6 and the insulating cover layer 8, respectively.

In the embodiment shown in FIG. 1, the flexible insulating cover layer 8 is made of the same material as the second core layer 6, i.e. an aerogel matrix composite, preferably comprising aerogel reinforced with mineral fibres. By using the same material for the insulating cover layer 8 and the second core layer 6, it is possible to choose an adhesive that adheres well to both layers.

Figure 2:
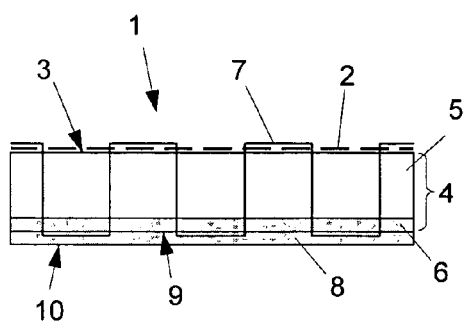
FIG. 2 shows a cross-section of the insulating product shown in FIG. 1.

FIG. 2 shows a cross-section of the product 1 shown in FIG. 1. In FIG. 2, it is clearly shown how the metal thread 7 that interconnects the metal wire mesh 2, the first core layer 5 and the second core layer 6 do not extend to the bottom side 10 of the product 1, i.e., the lowermost side of the insulating cover layer 8. In use, i.e. when the insulating product is applied onto a surface of a boiler, a pipe, a ventilation duct, or another installation, the bottom side 10 will be arranged against the surface and due to the insulating cover layer, there is no direct contact between the surface of the insulated installation and the metal thread extending through the core layer 4 and the metal wire mesh 2.

Figure 3:
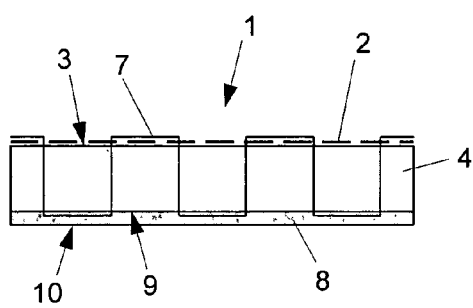
FIG. 3 shows a cross-section of a second embodiment of an insulating product according to the invention.

FIG. 3 shows another embodiment of a flexible insulating product 1 according to the invention. Note that the same reference numerals will be used for the similar parts as in FIGS. 1 and 2 even though they might differ in structure and/or materials.

The main difference between the embodiments shown in FIGS. 1 and 2 and in FIG. 3 is that the flexible insulating core layer 4 in the embodiment shown in FIG. 3 comprises only one layer of insulating material. This insulating core layer 4 may, e.g., be made of mineral wool or an aerogel matrix composite or a mixture of such materials. In accordance with the invention, a flexible insulating cover layer is applied to the second side 9 of the insulating core layer by means of, e.g., an inorganic adhesive.

The invention claimed is:

1. A flexible heat insulation product (1) comprising:
 a flexible heat insulating core layer (4) with a first side (3) and a second side (9), and
 a flexible facing (2) that is connected to the first side (3) of the insulating core layer (4) by a plurality of elements (7) that extends from the facing (2) to the second side (9) of the insulating core layer (4), wherein the insulation product (1) further comprises a flexible heat insulating cover layer (8) that is secured to the second side (9) of the insulating core layer (4) and wherein the plurality of elements (7) that extends from the facing (2) to the second side (9) of the insulating core layer (4) does not extend through the flexible heat insulating cover layer (8).

2. An insulation product according to claim 1, wherein the insulating core layer (4) comprises mineral wool.

3. An insulation product according to claim 1, wherein the insulating cover layer (8) comprises aerogel.

4. An insulation product according to claim 1, wherein the insulating cover layer (8) is secured to the insulating core layer (4) by an adhesive.

5. An insulation product according to claim 4, wherein the adhesive is an inorganic adhesive.

6. An insulation product according to claim 1, wherein the insulating core layer (4) comprises a first core layer (5) comprising mineral wool and a second core layer (6) comprising aerogel, and that the insulating cover layer (8) is secured to the second core layer (6).

7. An insulation product according to claim 1, wherein the plurality of elements (7) connecting the facing (2) with the insulating core layer (4) comprises one or more metal threads extending through the facing (2) and the insulating core layer (4).

8. An insulation product according to claim 1, wherein the facing (2) is a metal wire mesh.

9. An insulation product according to claim 1, wherein the facing (2) is a foil or sheet.

10. An insulation product according to claim 9, wherein the foil or sheet is reinforced with glass fibres.

* * * * *